United States Patent
Guajardo Merchan et al.

(10) Patent No.: US 11,683,341 B2
(45) Date of Patent: Jun. 20, 2023

(54) SYSTEM AND METHOD FOR NETWORK INTRUSION DETECTION BASED ON PHYSICAL MEASUREMENTS

(71) Applicant: Robert Bosch GmbH, Stuttgart (DE)

(72) Inventors: Jorge Guajardo Merchan, Pittsburgh, PA (US); Stefan Gehrer, Pittsburgh, PA (US); Shalabh Jain, Pittsburgh, PA (US); Saraswathy Ramanathapuram Vancheeswaran, Pittsburgh, PA (US); Timo Lothspeich, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 567 days.

(21) Appl. No.: 16/723,861

(22) Filed: Dec. 20, 2019

(65) Prior Publication Data
US 2021/0194921 A1    Jun. 24, 2021

(51) Int. Cl.
*G06F 21/00* (2013.01)
*H04L 9/40* (2022.01)
*G06F 8/65* (2018.01)
*G06F 8/71* (2018.01)

(52) U.S. Cl.
CPC ............ *H04L 63/1475* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 9,471,770 B2 | 10/2016 | Beyer et al. | |
| 9,667,419 B2* | 5/2017 | Guajardo Merchan | H04L 9/0866 |
| 9,806,884 B2* | 10/2017 | Lewis | H04L 9/0877 |
| 9,883,209 B2* | 1/2018 | Ricci | G08G 1/07 |
| 9,887,844 B2* | 2/2018 | Gehrer | G09C 1/00 |
| 10,214,166 B2* | 2/2019 | Dlagnekov | G01P 15/0891 |
| 2014/0020089 A1* | 1/2014 | Perini, II | G06F 21/32 726/19 |

(Continued)

FOREIGN PATENT DOCUMENTS

| | | |
|---|---|---|
| WO | 2018104929 A1 | 6/2018 |
| WO | 2019030763 A1 | 2/2019 |

OTHER PUBLICATIONS

Clark et al., "Wattsupdoc: Power side channels to nonintrusively discover untargeted malware on embedded medical devices," in Presented as part of the 2013 USENIX Workshop on Health Information Technologies, 2013, 11 pages.

(Continued)

*Primary Examiner* — Maung T Lwin
(74) *Attorney, Agent, or Firm* — Dickinson Wright PLLC

(57) ABSTRACT

A system includes a memory and a processor in communication with the memory. The processor is programmed to receive a runtime measurement from a sensor regarding the physical attribute of at least the separate processor during runtime; compare the runtime measurement of the physical attribute to a fingerprint that includes a baseline measurement of a physical attribute of at least a separate processor during an evaluation period of the system, and in response to the measurement exceeding a threshold, executing a countermeasure operation against software ran by the separate processor.

20 Claims, 4 Drawing Sheets

(56) References Cited

U.S. PATENT DOCUMENTS

| | | | |
|---|---|---|---|
| 2016/0179243 A1* | 6/2016 | Schwartz | G06F 3/0446 |
| | | | 345/174 |
| 2017/0270295 A1 | 9/2017 | Park et al. | |
| 2018/0205754 A1* | 7/2018 | North | H04L 63/145 |
| 2018/0262527 A1* | 9/2018 | Jain | H04L 9/0838 |
| 2019/0245872 A1 | 8/2019 | Shin et al. | |
| 2021/0107537 A1* | 4/2021 | Ross | B61L 25/025 |

OTHER PUBLICATIONS

Liu et al., "On Code Execution Tracking via Power Side-Channel." ACM Press, 2016, Austria, pp. 1019-1031, 13 pages.

H. Liu and E. Y. Vasserman, "Gray-Box Software Integrity Checking via Side-Channels," in International Conference on Security and Privacy in Communication Systems. Springer, 2017, 21 pages.

H. Liu, H. Li, and E. Y. Vasserman, "Practicality of using side-channel analysis for software integrity checking of embedded systems," in International Conference on Security and Privacy in Communication Systems, 17 pages.

* cited by examiner

SYSTEM AND METHOD FOR NETWORK INTRUSION DETECTION BASED ON PHYSICAL MEASUREMENTS

TECHNICAL FIELD

The present disclosure relates to security of a computer system, such as a vehicle computer system or other type of system.

BACKGROUND

Modern automotive in-vehicle networks present a large attack surface from a security point of view, due to both the amount of Electrical Control Units (ECUs) and their connectivity to external networks. Detecting a malicious intrusion into such networks is an integral part of automotive security to prevent or at least lower the impact of attacks.

SUMMARY

According to one embodiment, a system includes memory and a processor in communication with the memory. The processor is programmed to define a fingerprint that includes a baseline measurement of a physical attribute of at least a separate processor during an evaluation period of the system, receive a runtime measurement from a sensor regarding the physical attribute of at least the separate processor during runtime, compare the runtime measurement of the physical attribute to the fingerprint, and in response to the measurement exceeding a threshold, executing a countermeasure operation against software ran by the separate processor.

According to another embodiment, a computer-implement method includes defining a fingerprint that includes a baseline measurement of one or more physical attributes of at least a separate processor during an enrollment period of the system, receiving a runtime measurement from a sensor regarding the one or more physical attributes of at least the separate processor during runtime, comparing the runtime measurement of the physical attribute to the fingerprint, and in response to the measurement exceeding a threshold, executing a countermeasure operation against software ran by the separate processor.

According to a further embodiment, a system includes a memory and a processor in communication with the memory. The processor is programmed to receive a runtime measurement from a sensor regarding the physical attribute of at least the separate processor during runtime, compare the runtime measurement of the physical attribute to a fingerprint that includes a baseline measurement of a physical attribute of at least a separate processor during an evaluation period of the system, and in response to the measurement exceeding a threshold, executing a countermeasure operation against software ran by the separate processor.

DETAILED DESCRIPTION

Figure 1:
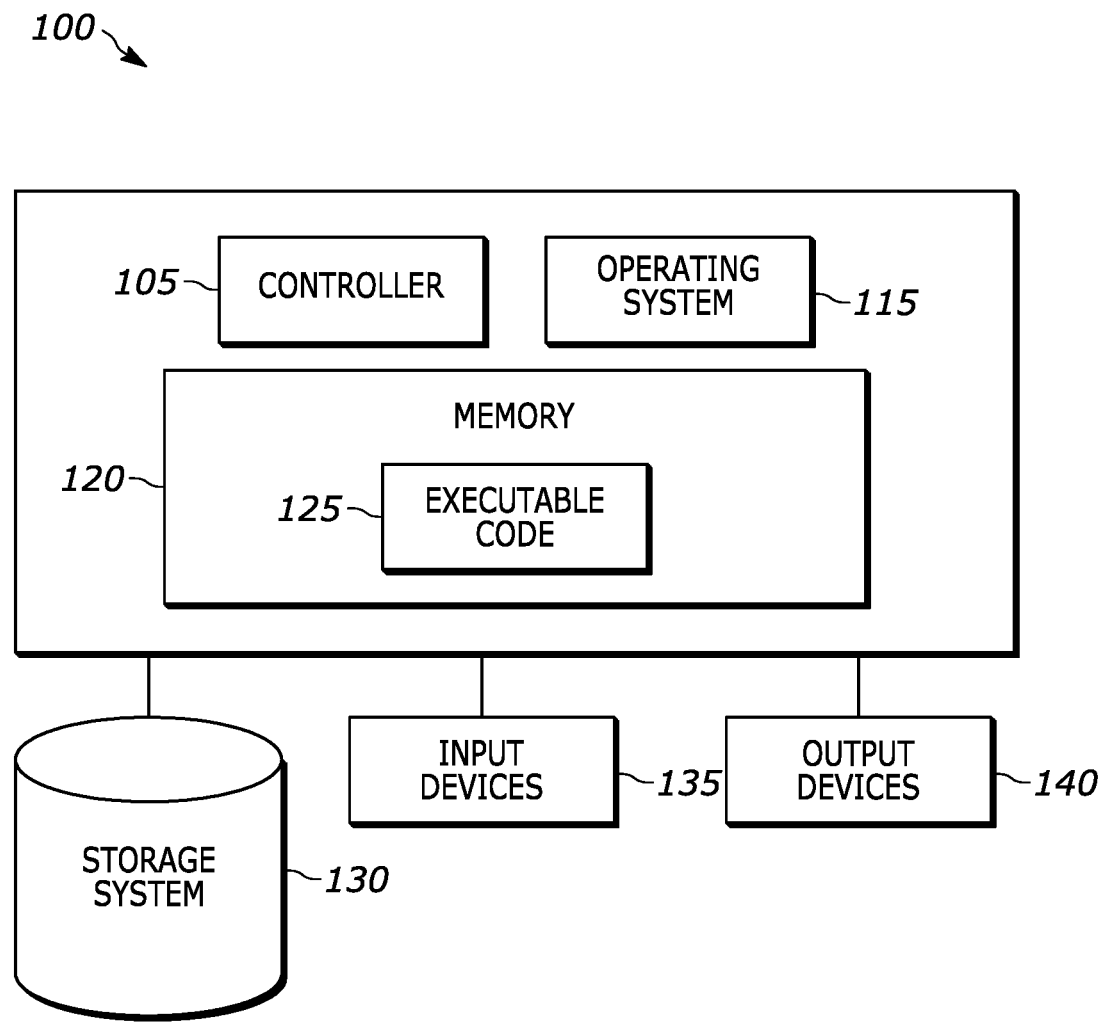
FIG. 1 illustrates a block diagram of an exemplary computing device, according to some embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The illustrative embodiment introduces a system and method to detect such malicious attacks. A physical property of a device or electronic control unit (ECU) connected to an in-vehicle bus may constantly be measured. The measurement may then be compared to a reference measurement performed during a profiling phase. Alternatively, the reference measurement is stored in a secured or protected (for example, encrypted) memory or secure element such a Hardware Security Module (HSM). Alternatively, the measurement could be transmitted to a gateway/network Intrusion Detection System (IDS) or Intrusion Detection and Prevention System (IDPS) residing locally in the car or remotely in a central server collecting all measurements. The IDS or IDPS may conduct such a comparison. The IDS or IPDS may also work with other measurements or characteristics to improve the detection for measurements. For example, additional measurements may include the frequency of messages classified according to message IDs, the time interval between successive same messages, etc. Furthermore, the network transmission could be correlated with the processing by sending a signature of the processing after the transmission of critical messages. The transmission of an injected message would ideally have a different signature since there wouldn't be processing involved. Furthermore, remote attestation capabilities could be added, which would allow the network IDS to send challenges that trigger a sequence of functions which are fingerprinted via power/timing and these fingerprints are sent with a response that are verified. Other possible ways to fingerprint the running of the software could be through sound using microphones or via vibration using MEMS sensors. Notice that the sensors measuring the physical criteria (power, timing, sound, vibration, etc.) can be included as part of an existing gateway, microcontroller or can be included at the board level external to the device being measured. In some cases, some or all the processing could happen inside the sensor. The measurement may be securely transmitted to the verifying IDS (e.g., the HSM, central server, central gateway, etc.). In another embodiment, the measurement may simply be transmitted to the verifying IDS without any additional security. As such, a side-channel attack may be detected or be preventable utilizing such a system as disclosed below.

The system may utilize an external or internal sensor to perform a device measurement of a physical property (e.g. power, timing, sound, temperature, vibration, etc.) to perform an initial baseline measurement. This measurement is used to derive a fingerprint using, for example, ML techniques, signal processing techniques or a combination thereof.

As shown in FIG. 1, which shows a block diagram of an exemplary computing device, according to some embodiments of the disclosure. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authentication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a nonvolatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, microphones, analog to digital converters, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device, JTAG interface, or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units.

A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as computing device 100.

Figure 2:
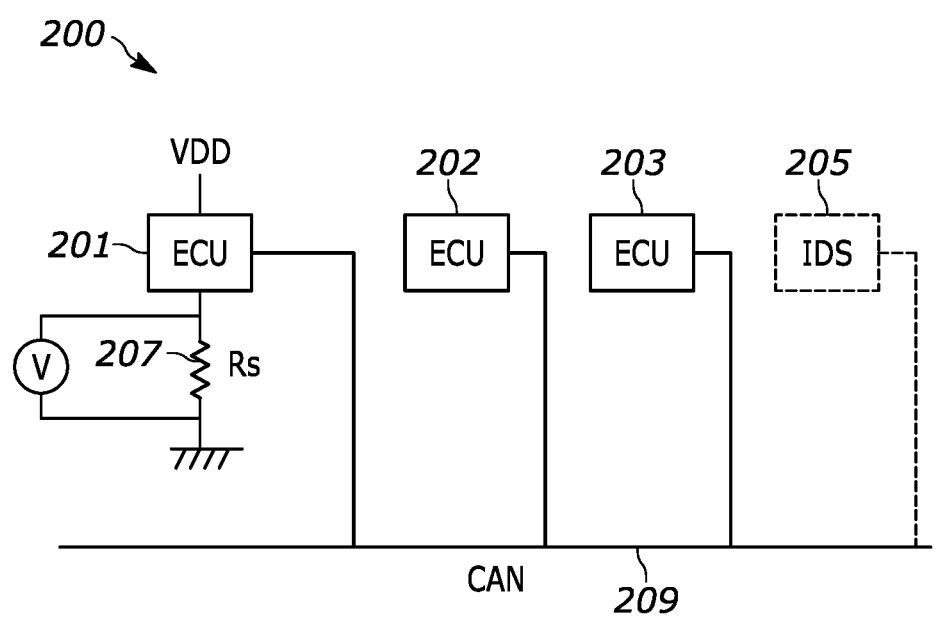
FIG. 2 illustrates an exemplary block diagram of a computing device utilizing a shunt resistor to measure current drawn from an ECU attached to a CAN bus.

FIG. 2 illustrates an exemplary block diagram of a computing device utilizing a shunt resistor to measure current drawn from an ECU attached to a CAN bus. The circuit 200 may include a first ECU 201, second ECU 202, third ECU 203, an intrusion detections system (IDS) 205, and a shunt resistor 207. The circuit may connect each of these components by a CAN bus 209. The CAN bus 209 may be utilized to allow various ECUs or controllers in the vehicle to communicate with one another. The IDS 205 may be utilized to store a fingerprint and other secure data related to the system. The fingerprint may be used as a profile of the ECU or circuit and be utilized by the IDS to detect malicious behavior. While multiple ECUs are shown in circuit 200, alternative embodiments may include more or less ECUs that are utilized.

The circuit 200 may include a first ECU 201 that is connected to a shunt resistor 207. Rather than utilizing a shunt resistor, the system may utilize an electro-magnetic probe to take measurements of the circuit. The shunt resistor 207 may take voltage measurements of the first ECU 207. For example, the shunt resistor 207 may detect a voltage drain of the first ECU 207. In another embodiment, the circuit 200 may include additional ECUs that can detect physical properties of an ECU or circuit. The shunt resistor 207 may be grounded out as shown in circuit 200.

The IDS 205 may be utilized to store the fingerprint. In another embodiment, the IDS may be utilized to draw measurements from the first ECU 201 that is connected to the shunt resistor 207 or another type of sensor or probe. The IDS 205 may thus make the determination of whether an anomaly has occurred that requires a countermeasure to be executed. The fingerprint may be code that is utilized to identify normal operation of the system by utilizing one or more measurements of physical attributes from one or more ECUs of the system. The measurements may be derived from a sensor that can be utilized to identify physical attributes of the ECUs or the system. For example, the system may utilize a sensor such as a microphone, accelerometer, gyroscope, thermal component (thermistor), thermometers, or any other similar internal or external sensors, etc. For example, the system may derive a fingerprint from utilizing a physical measurement of current or voltage from an ECU, as well as a temperature of the ECU. The system may measure the voltage across a resistor (e.g., shunt resistor 207). The shunt resistor 207 may act as a voltage divider. Depending on the resistance (load) of the ECU, the ratio between shunt resistor resistance (which is static) and the ECU may change, which leads to the voltage drop across the shunt 207. The voltmeter across the shunt 207 can therefore be used to get an absolute and/or relative information about the load of the ECU. To perform the actual measurement and transform that measurement it to a digital value that can be analyzed, the system may utilize an analog-to-digital converter (ADC) or an operational amplifier (op-amp). Such an embedded ADC may be available in a microcontroller.

In an alternative embodiment, the measurements could be transmitted to a gateway or network IDS that is remote from the circuit. The remote IDS may then take measurements of the circuit and do the comparisons. The network transmission could be correlated with the processing by sending a signature of the processing after the transmission of critical messages. The transmission of an injected message would ideally have a different signature since there wouldn't be processing involved. Remote attestation capabilities may also be added to allow the network IDS to send challenges that trigger a special sequence of functions or instructions which result in a finger print (resulting from measurements of power consumption, timings, sound, temperature, vibration, or other physical attributes, etc.). The fingerprints may be sent to a verifier (which can be a protected area of the same device, a different local device, or a remote device or cloud service) where the fingerprints are verified. The fingerprints may be derived from a physical measurement can also be used to define a context (e.g., a specific situation in which the device is running, such as driving slowly, driving fast, stopped, etc.) The context may be utilized in turn to be used to specify rules (e.g., how to respond) by the IDS.

Figure 3:
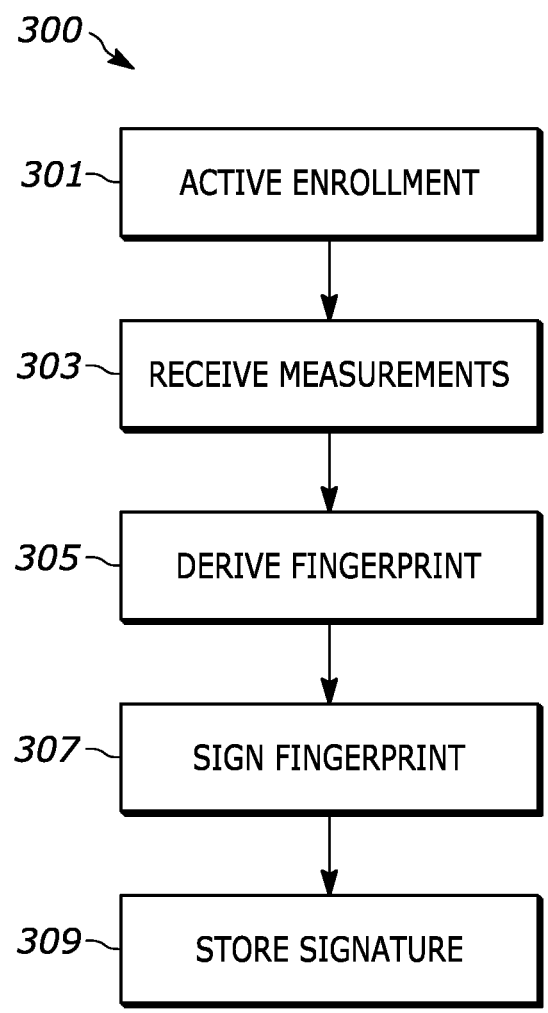
FIG. 3 illustrates a flow chart 300 of an enrollment period of the computing device.

FIG. 3 discloses a flow chart illustrating the active enrollment period for a system according to an embodiment. At step 301, the system may activate in an enrollment period. At the enrollment period, the system may analyze various attributes to determine normalized measurements for physical attribute of the system. The enrollment period may help determine a fingerprint associated with the system. Various attributes that may be measured include power, timing, sound, temperature, vibration, radiation, etc. The enrollment period may be activated at different stages. For example, the enrollment period may be activated by the OEM during manufacturing. The OEM may have developed their own software and train the fingerprinting of the software prior to deployment in the system. If the OEM control the enrollment at manufacturing, it may provide additional security because manufacturing may be in a secure environment to make sure that the software has not been tampered with. In another embodiment, enrollment may occur during operation of the car or system at specified intervals that allows the system to perform retraining. From a security point of view, this may be less secure than at manufacturing because it will require to verify that the system is in a secure environment. Another way to prevent attacks would be to only do the enrollment when there is not too much difference between the current measurement and last measurement that was performed (likely the signed fingerprint). In such a scenario, this may allow fine-tuning of the fingerprint. Another embodiment would be to allow the system to perform re-enrolment during servicing a car or system at a "trusted" service center, like a dealership or an associated retail store.

At step 303, the system may receive and aggregate the measurements. Thus, the system may perform measurements that are utilized to derive the fingerprint. An external or internal sensor may perform a device measurement of a physical attribute of the system, including power, timing, sound, temperature, vibration, radiation, etc. The system may take measurements for a threshold period of time at various stages of operation. The measurements may be stored in memory after each threshold period of time. The measurements may be done for each physical attribute, such as power consumption, timing, sound, temperature, vibration, radiation, etc.

At step 305, the system may derive a fingerprint associated with the system. The fingerprint may be derived from the physical attributes. The fingerprint may be a data set that includes information related to the baseline measurements of the physical attributes of the system. Thus, the fingerprint may be utilized to identify normal operation of the system. The fingerprint may include one attribute's baseline measurement, or several attributes baseline measurements. For example, the fingerprint may include only a baseline measurement for power consumption of the system. The fingerprint may be a set of features derived from raw measurements, which may tend to be more stable to change over time, or more stable to environmental conditions, or both. The fingerprint may be a combination of features and/or raw measurements. In another example, the fingerprint may include a baseline measurement for power consumption, timing, sound, temperature, vibration, and radiation in another example. The fingerprint may be used using various techniques, such as machine learning techniques, signal processing techniques, or a combination thereof. The fingerprint may be derived by an ECU associated with the IDS.

At step 307, the system may sign the fingerprint. The fingerprint may be signed utilizing standard cryptographic schemes, such as private key/public key schemes. In some systems, the fingerprint maybe protected against unauthorized changes by computing a message authentication code (MAC) on the fingerprint with a key that is shared with a verifier. This assumes that access to the key is kept secret and secured from unauthorized access. In other systems, it might be possible to measure and send the fingerprint without any additional cryptographic protection. Thus, cryptographic protection may be utilized in an option in alternative embodiments. The reason this works is that you are performing the measurement with a different (possibly external) device likely independent of the device executing the software that needs to be fingerprinted. So you can assume in some cases that this device used to fingerprint (measure physical signals and derive fingerprint) has also a secure connection to the IDS or the backend (or both). The signature may add additional security mechanisms to the fingerprint in order to prevent a cyber threat. In an alternative embodiment, the fingerprint may be encoded data that is not able to be read without being decoded.

At step 309, the signature, fingerprint, and associated public key may be stored in memory. The signature and public key may be stored in different memory areas. Furthermore, the signature may be stored in read-only memory or other memory that is not writable. Both the signature and public key may also be stored in memory that is remote from the system. Alternatively, to storing the complete key, a link to the public key could be stored that may later be retrieved. In another embodiment, a hash of the public key stored in fuses may be stored, and the complete key may be stored elsewhere. In yet another embodiment, the protocol may require that the entity checking may send public key with a verification request.

Figure 4:
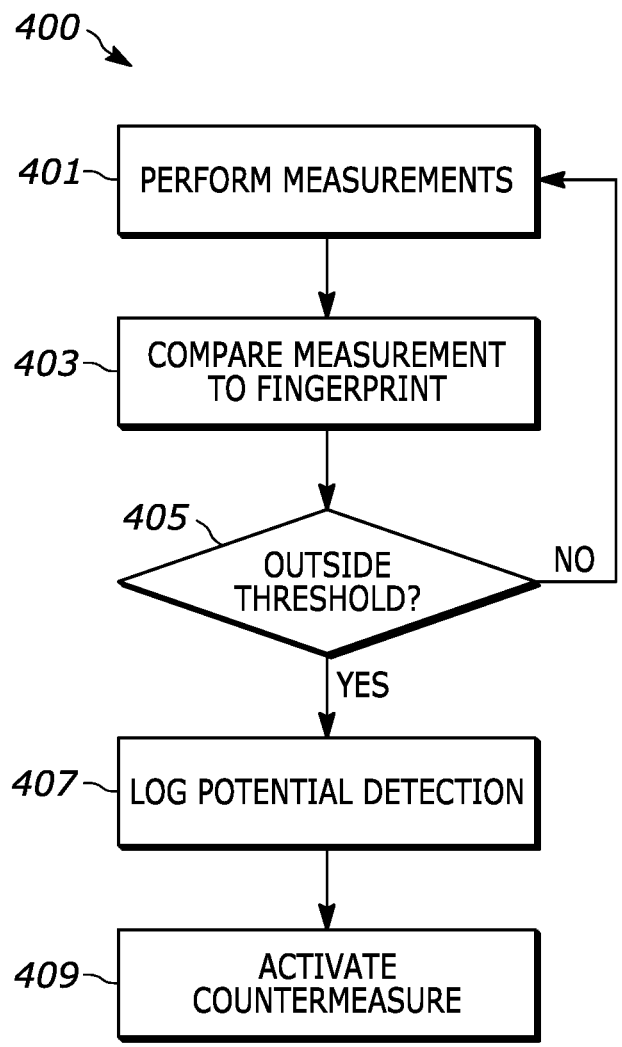
FIG. 4 illustrates a flow chart 400 of run time period of the computing device.

FIG. 4 discloses a flow chart illustrating the runtime period for a system according to an embodiment. At step 401, the system may perform measurements of the system. The measurements may include measurements to any physical attributes of the device. The measurements may be performed at specified intervals. Thus, the measurements may be taken at specified intervals when certain software, processes, or operations are being performed or even halted. The intervals may be at varied time frames or periods as well.

At step 403, the system may compare the measurement to the fingerprint. Thus, the system may derive a run-time fingerprint that is utilized to compare to the fingerprint from the enrollment phase. The system may utilize the IDS for the comparison to the measurements to the fingerprint. In another embodiment, the system may send the information to a remote server for verification, rather than verifying on the system or device itself. In another embodiment, the IDS (locally running in the car or remote in a backend), receives the fingerprint and combines the fingerprint information with other information not related to the fingerprint but related to the expected normal operation of the system under surveillance. This expected normal operation can include (but is not limited to) expected values of signals transmitted, expected arrival times or frequency of periodic signals. The IDS then would combine all the information to make a decision as to whether the software has been tampered with or not. The system may perform measurements that can be triggered periodically, using an external trigger, or internally at a start or end of every function that is running on the system. In yet another embodiment, the fingerprint can be combined with fingerprint related information, which may include, for example, an error correcting code derived during the enrolment process. The aim is to correct small deviations in the fingerprint measurement which are due to variations in the measurement set up, normal aging in the electronic components that form part of the ECU, or changes in the environmental conditions that can affect the fingerprint measurement during normal operation. The fingerprint related information, combined with the current fingerprint measurement, will result in "derived" fingerprint(s) that can be used by the IDS to make a decision as to whether there has been an intrusion and if so take an appropriate action. In some embodiments, there may be different error correction information utilized based on the current state of the ECU or the environment under which the ECU is currently operating (for example, different error correction information depending on the temperature under which the ECU currently operates).

At step 405 the system may determine if the measurement is outside of a predefined threshold. While the baseline measurement may be performed during enrollment, the system may compare the new measurement to be compared using a distance measure of choice. The distance measure may include Hamming distance, Euclidean distance, Least Squares, etc. Based on the distance result and comparison to a threshold, the system may the decide if the software has been tampered with. For example, this may include actual instructions executed and the accompanying order. If the measurement is not outside the threshold, the system may continue to monitor measurements. In an alternative embodiment, the system may utilize classification techniques such as Support Vector Machines (SVMs), k-nearest neighbors algorithm (k-NN), naive Bayer, or (deep) neural networks to be used to make the detection even more accurate.

At step 407, the system may log the potential detection. The IDS or another controller may be utilized in this process. The IDS may log the time and date of the occurrence, associated measurements of the physical attributes of the system or ECU, any software or processes that were running, any remote connections established, etc. The log may also be saved remotely. The log may be used in later processes to help identify countermeasures to any issues that occurred in the process. For example, the log may be later utilized by software developers to help create firewalls or other measures to prevent cyber-attacks. The log might include the derived fingerprint, the raw signal or signals from which the fingerprint was derived, or any other signals that are measured but are not being used for the fingerprint explicitly. The log also may include the time and date of the event (e.g., timestep), the function that was running on the system or ECU, information about the derived fingerprint, or other information about the state of the ECU. Some examples of the state of the ECU may include, for example, counters, programs running at the time, etc. In some embodiments the log might also include a signature to guarantee that the information in the log cannot be modified at a later time but a malicious user or adversary. In an alternative embodiment, the raw measurement may be saved if storage allocation allows it to be saved in memory.

At step 409, the system may activate a countermeasure if it is determined that an anomaly has been detected. The system may thus trigger further actions. Such actions may include kill, delay, or modify a process. The system may also send a message our output a notification to a user notifying them of a threat. The notification may be output on a display associated with the system, such as a monitor or mobile phone. In another embodiment, the countermeasure may include modifying code or resetting the system or device to an original code, such as factory code or an original version of code prior to a previous update. In yet another embodiment, the countermeasure may include disabling the ECU. Thus, any updates that may have vulnerabilities are removed. In another embodiment, the system may disable or reboot the device, end a network connection (e.g., disconnect), or reset the device. In yet another embodiment, if the anomalies detected are determined to be actual tampering attacks, the physical measurements received by the verifying entity (e.g., the IDS) may be used to adaptively update the threshold used to device whether software tampering has happened or not. Thus, the threshold may actively change in response to the physical measurements occurring at real time. In an alternative embodiment, no countermeasure may be issued and instead an alarm is raised and transmitted to another system (this could be another ECU). That other system (e.g., ECU) may then either take an action (countermeasure) or issue a warning to a user. In one example, a light may be illuminated on a dashboard of a car to notify the driver of an issue so that the driver can decide to take the car to a repair shop, or if it is a critical error, the driver can choose to stop the car. In another embodiment, a notification may be illuminated on display of the vehicle to notify the user of the issue.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM or flash memory devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
   memory;
   a processor in communication with the memory and programmed to:
   during an enrollment period, define a fingerprint that includes a baseline measurement of a physical attribute of at least a separate processor during the enrollment period of the system in a secured environment using Original Equipment Manufacturer (OEM) components to establish normalized measurements, wherein the enrollment period includes measuring the physical attribute of the separate processor prior to runtime operation;
   receive, from a sensor, a runtime measurement of the physical attribute of at least the separate processor during runtime;
   compare the runtime measurement of the physical attribute to the fingerprint; and
   in response to the runtime measurement exceeding a threshold, executing a countermeasure operation against software ran by the separate processor.

2. The system of claim 1, wherein the physical attribute includes a power consumption.

3. The system of claim 1, wherein the physical attribute includes a time interval between message communications of the separate processor.

4. The system of claim 1, wherein the physical attribute includes a sound emitted from the separate processor.

5. The system of claim 1, wherein the physical attribute includes a temperature.

6. The system of claim 1, wherein the physical attribute includes a vibration.

7. The system of claim 1, wherein the memory is configured to store the fingerprint.

8. The system of claim 1, wherein the processor is further programmed to, in response to the measurement exceeding a threshold, log the measurement and store the log in the memory.

9. The system of claim 1, wherein the sensor is a shunt resistor.

10. The system of claim 1, wherein the fingerprint includes two or more physical attributes of at least the separate processor during the enrollment period of the system.

11. A computer-implement method, comprising:
defining a fingerprint that includes a baseline measurement of one or more physical attributes of at least a separate processor during an enrollment period of a system in a secured environment using Original Equipment Manufacturer (OEM) components to establish normalized measurements, wherein the fingerprint includes code utilized to identify normal operation of the system utilizing one or more measurements of the one or more physical attributes;
receiving a runtime measurement from a sensor regarding the one or more physical attributes of at least the separate processor during runtime;
comparing the runtime measurement of the physical attribute to the fingerprint; and
in response to the runtime measurement exceeding a threshold, executing a countermeasure operation against software ran by the separate processor.

12. The computer-implemented method of claim 11, wherein the threshold is updated in response to the comparing the runtime measurement of the physical attribute to the fingerprint.

13. A system comprising:
memory;
a processor in communication with the memory and programmed to:
receive a runtime measurement from a sensor regarding the physical attribute of at least the separate processor during runtime;
compare the runtime measurement of the physical attribute to a fingerprint, wherein the fingerprint includes a baseline measurement of a physical attribute of at least a separate processor, wherein the baseline measurement is determined during an enrollment period of the system in a secured environment using Original Equipment Manufacturer (OEM) components to establish normalized measurements; and
in response to the runtime measurement exceeding a threshold, executing a countermeasure operation against software ran by the separate processor.

14. The system of claim 13, wherein the processor is further programmed to, in response to the measurement exceeding a threshold, log the measurement and store the log in the memory.

15. The system of claim 13, wherein the countermeasure operation includes killing the software ran by the separate processor.

16. The system of claim 13, wherein the countermeasure operation includes rebooting the system.

17. The system of claim 13, wherein the countermeasure operation includes reprogramming the software ran by the separate processor to original code.

18. The system of claim 13, wherein the countermeasure operation includes reprogramming the software ran by the separate processor.

19. The system of claim 13, wherein the physical attribute includes a temperature.

20. The system of claim 13, wherein the physical attribute includes a vibration.

* * * * *